(12) United States Patent
Johnson et al.

(10) Patent No.: US 9,961,915 B2
(45) Date of Patent: May 8, 2018

(54) SYSTEMS AND METHODS FOR CONTINUOUS FLOW OZONE TREATMENT OF GRAIN

(75) Inventors: Lynn Johnson, American Falls, ID (US); DelRon E. Albert, Aberdeen, ID (US); Vane Case, Blackfoot, ID (US); Kevin C. Johnson, Pocatello, ID (US)

(73) Assignee: Archer Daniels Midland Co., Decatur, IL (US)

( * ) Notice: Subject to any disclaimer, the term of this patent is extended or adjusted under 35 U.S.C. 154(b) by 839 days.

(21) Appl. No.: 12/645,279

(22) Filed: Dec. 22, 2009

(65) Prior Publication Data

US 2011/0151079 A1 Jun. 23, 2011

(51) Int. Cl.
*A23B 9/18* (2006.01)
*A23L 3/3409* (2006.01)

(52) U.S. Cl.
CPC .............. *A23B 9/18* (2013.01); *A23L 3/3409* (2013.01); *A23V 2002/00* (2013.01)

(58) Field of Classification Search
USPC ...... 426/320; 34/179, 233, 236; 422/186.08, 422/186.12
See application file for complete search history.

(56) References Cited

U.S. PATENT DOCUMENTS

| 1,220,160 | A | * | 3/1917 | Moore | ........................... 99/476 |
| 1,267,204 | A | | 5/1918 | Frick | |
| 3,755,917 | A | * | 9/1973 | Lambert, Jr. | ................... 34/179 |
| 3,918,404 | A | | 11/1975 | Bunger | |
| 4,454,807 | A | | 6/1984 | Wolstenholme | |
| 4,549,477 | A | | 10/1985 | McCabe, Jr. | |
| 4,726,286 | A | | 2/1988 | Anderson | |
| 4,795,651 | A | | 1/1989 | Henderson et al. | |
| 4,884,700 | A | | 12/1989 | Carroll | |
| 4,954,321 | A | | 9/1990 | Jensen | |

(Continued)

FOREIGN PATENT DOCUMENTS

JP 4200749 7/1992

OTHER PUBLICATIONS

Kells, Steven A., Efficacy and Fumigation Characteristics of Ozone in Stored Maize, Journal of Stored Product Research, Sep. 2000, vol. 37, pp. 371-382.
Herrman, Timothy J., Integrated Pest Management in Grain Storage and Feed Mills, ASA Technical Bulletin, vol. FT47, 1998.
Sopher, Charles D., Studies on the Use of Ozone in Production Agriculture and Food Processing, International Ozone Association, 2002.

(Continued)

*Primary Examiner* — D. Lawrence Tarazano
*Assistant Examiner* — Stephanie A Cox
(74) *Attorney, Agent, or Firm* — Andrew F. Nilles (57) ABSTRACT

Methods and systems for treatment of grain for toxins and/or odor utilize a storage container having a grain storage space and an aeration floor that allows air to flow through the aeration floor into the grain storage space. Ozone (mixed with air) is supplied to the grain through the aeration floor under positive pressure, whereby ozone is forced through the aeration floor into a lower portion of the grain storage space. After an initial treatment time, the initial treatment time allowing for the ozone to reduce toxins and/or odor in a lowermost portion of the initial quantity of grain an effective or desired amount, a lowermost portion or a lower treated portion of the grain in the grain storage space is removed, and new grain is added on top of the grain in the grain storage space, all while continuing to supply ozone through the aeration floor under positive pressure.

14 Claims, 10 Drawing Sheets

(56) References Cited

U.S. PATENT DOCUMENTS

| | | | |
|---|---|---|---|
| 5,181,616 A * | 1/1993 | Le Gigan | 209/31 |
| 5,263,896 A | 11/1993 | Carroll | |
| 5,326,543 A | 7/1994 | Fiorenzano, Jr. | |
| 5,403,441 A | 4/1995 | McDonald | |
| 5,700,505 A | 12/1997 | Hurst | |
| 6,387,241 B1 | 5/2002 | Murphy et al. | |
| 7,138,145 B2 | 11/2006 | Walker | |
| 7,351,373 B2 | 4/2008 | Reid et al. | |
| 2007/0134380 A1 * | 6/2007 | Vetter et al. | 426/320 |
| 2009/0094853 A1 | 4/2009 | Noyes et al. | |
| 2009/0117016 A1 * | 5/2009 | Decker et al. | 422/186.08 |
| 2009/0191091 A1 | 7/2009 | Danchenko et al. | |

OTHER PUBLICATIONS

Mason, L.J., Ozone: A New Control Strategy for Stored Grain, PS7-33-6314.

Maier, Food Grains Ozonation—A New Stored Product IPM Pest Control Technology, Purdue University.

Maier, D., Modeling Airflow in Outdoor Grain Pile Aeration Systems, PS10-7-6159.

Maier, D.E., Ozonation as a Non-Chemical Stored Product Protection Technology, PS7-14-6162.

Hipolito de Sousa, Adalberto, Ozone As Alternative to Manage Phosphine-Resistant Populations of Rhyzopertha Dominica, IOA Conference and Exhibition Valencia, Spain, Oct. 2007.

* cited by examiner

SYSTEMS AND METHODS FOR CONTINUOUS FLOW OZONE TREATMENT OF GRAIN

BACKGROUND OF THE INVENTION

1. Field of the Invention

The present invention relates to grain treatment, and more particularly to systems and methods for treating grain with ozone in a continuous flow system.

2. Background and Related Art

Many types of grain are grown for human and animal consumption and use. The condition of the grain is often affected by the growing conditions, and when the grain is harvested, it may be found to contain insects, mold and/or bacteria, unwanted odors, and/or toxins remaining from the presence of molds and the like. Additionally, once grain has been harvested, it often is stored for some time prior to final distribution and use. During times of storage, existing problems with the grain can be exacerbated. Depending on the extent and severity of the odor, mold, or toxin problems, the value of the grain can be slightly to greatly reduced.

Several forms of mycotoxins can be found in harvested and/or stored grain, including vomitoxin, aflatoxin, and fumonisin. These toxins are residues left behind by molds that may no longer be present in the grain. Certain conditions during certain periods of the grain growth cycles encourage mold growths, and the toxins are the afterproducts of that growth. It is essentially impossible to spray or treat the growing grain in such a way as to treat or prevent the mold outbreaks. Therefore, farmers generally have to hope for favorable growing conditions that do not encourage mold proliferation.

In Europe, statutory levels of a range of mycotoxins permitted in food and animal feed are set by a range of European directives and Commission regulations. The U.S. Food and Drug Administration has regulated and enforced limits on concentrations of mycotoxins in foods and feed industries since 1985. Vomitoxin is a common problem in smaller grains such as wheat and barley. Aflatoxin is affects the marketability of corn and peanuts. Fumonisin is problematic in corn crops.

BRIEF SUMMARY OF THE INVENTION

According to implementations of the invention, a method for treatment of grain for toxins and/or odors includes placing an initial quantity of grain in a storage container having a grain storage space and an aeration floor that allows air to flow through the aeration floor into the grain storage space. Ozone mixed with air is supplied to the grain through the aeration floor under positive pressure, whereby ozone is forced through the aeration floor into a lower portion of the grain storage space. After an initial treatment time, the initial treatment time allowing for the ozone to reduce toxins and/or odors in a lowermost portion or lower treated portion of the initial quantity of grain an effective or desired amount, a lowermost portion of the grain in the grain storage space is removed, and new grain is added on top of an uppermost portion of the grain in the grain storage space, all while continuing to supply ozone through the aeration floor under positive pressure.

The grain may be removed from the lowermost portion in an amount approximately equal to an amount of new grain added on top of the uppermost portion. In fact, the grain may be substantially continuously removed from the lowermost portion while substantially continuously adding new grain to the storage space. The rates of adding and removing grain may be selected so as to ensure that all grain removed from the lowermost portion has been exposed to ozone for a treatment time sufficient to reduce toxins and/or odors the effective or desired amount. Thus, the rate of adding and removing grain may be slowed for grain having higher concentrations of toxins and/or odors and quickened for grain having lower concentrations of toxins and/or odors.

To reduce environmental concerns with the use of ozone, the amount of grain in the storage container may be maintained at sufficient levels such that the ozone forced into the grain storage space with air is used up and does not penetrate all the way through the grain to the top, and therefore does not escape or need to be recaptured.

In some implementations, the storage container is one of a plurality of storage containers, each storage container having a grain storage space and an aeration floor. A density separator or other mechanism may be used to separate incoming grain into a plurality of grain streams of different densities and/or toxin levels. The grain from different grain streams may be provided to different storage containers where it is treated by ozone forced through the aeration floor with air. Treatment times for each of the storage containers may be made different using one or more of several techniques. In a first technique, grain is removed and/or added to different storage containers at different rates, thereby effectively changing the duration of treatment for grain in each storage container. In a second technique, different concentrations of ozone are supplied to different storage containers.

In a third technique, a lowermost portion of the grain in a first storage container is removed from the first storage container and added on top of an uppermost portion of the grain in a second storage container and a lowermost portion of the grain in the second storage container is removed from the second storage container. In this daisy-chain method, which can be repeated across two, three, or more storage containers, the grain is treated in each storage container, thus effectively lengthening the treatment time for grain so treated.

In some instances, the grain removed from the first storage container is mixed with new incoming grain before or while being added to the second storage container. This allows the same storage containers to simultaneously be used to treat grain from different grain streams (having different initial amounts of toxins and/or odors) by having initially-lower-toxin-level grain (and/or initially-lower-odor-level grain) pass through a storage container with initially-higher-toxin/odor-level grain after the initially-higher-toxin/odor-level grain has already received one or more treatment passes through a storage container. Additionally in some implementations, grain treated in different storage containers and/or for different lengths of time is remixed after treatment is complete.

In some multi-storage-container implementations, a lowermost portion of the grain is removed from the bottom of each of the storage containers and new grain is added to the top of in a continuous process while continuing to supply ozone through the aeration floors.

Some implementations of the invention provide a system and method for treatment of grain for toxins and/or odors in a continuous first-in-first out process by periodically to continuously removing a first quantity of grain from the bottom of a storage container having a grain storage space and an aeration floor that allows air to flow through the aeration floor into the grain storage space, by supplying ozone with air through the aeration floor under positive pressure, whereby ozone is forced through the aeration floor into a lower portion of the grain storage space, the ozone reducing toxins and/or odors in a lower portion of the grain an effective amount, and by periodically to continuously adding a second quantity of grain on top of an upper portion of grain in the grain storage space, whereby the grain storage space remains sufficiently filled that the ozone supplied through the aeration floor with air is unable to percolate and escape through the top of the grain stored in the storage space, but is instead used up. In at least some instances, the periodic removal and addition of grain occur in a substantially-continuous fashion.

In some implementations, the grain is removed using a process or mechanism that ensures removal of grain substantially evenly from all portions of the bottom of the storage container. The grain is added to the storage container such that it is substantially evenly dispersed to all portions of the top of the storage container. In this fashion, the grain passes through the storage container in a first-in-first-out manner.

Some implementations of the invention provide a system and method for treatment of grain for toxins and/or odors in one of a continuous first-in-first out process and a batch process using a system comprising a plurality of storage containers, each storage container having a grain storage space and an aeration floor that allows air to flow through the aeration floor into the grain storage space. Incoming grain is separated according to the presence of different amounts of toxins and/or odors to be treated. This may be done using a density separator or using any other method known in the art. The grain may be separated into batches or streams of grain. The separated grain is passed to different storage containers, where it is treated with ozone for different amounts of time and/or ozone concentrations according to the toxin levels and/or odors present.

In such implementations, treating the grain involves periodically to continuously adding grain from a selected grain source to a storage container assigned to the selected grain source. Ozone is supplied at desired concentrations in air through the aeration floor of the assigned storage container under positive pressure, whereby ozone is forced through the aeration floor into a lower portion of the grain storage space, the ozone reducing toxins and/odors in a lower portion of the grain an effective amount. A quantity of the grain is periodically to continuously removed as treated grain from the bottom of the assigned storage container.

The grains having different levels or amounts of toxins and/or odors may be treated with ozone for different amounts of time or using different concentrations of ozone. Where different amounts of time of treatment are used, the different amounts of time of treatment are provided using at least one several techniques, including 1) removing grain from the bottom of each of the assigned storage containers at different rates; and 2) cycling grain having higher initial toxin amounts and/or odors through more than one storage container in daisy-chain fashion. In the daisy-chain treatment mechanism, the grain having higher initial amounts of toxins and/or odors are exposed to repeated treatments of ozone in the different storage containers.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

It is anticipated that systems and methods according to embodiments of the invention can be used to treat large amounts of grain in a relatively short period of time. As such, the following terms, when used in the description or claims should be given the following definitions:

Grain—this term shall mean any of a variety of crops that may contain toxins and/or odor and may benefit from (i.e. have toxin levels reduced by) treatment according to the systems and methods disclosed herein. The definition of grain shall include cereals such as wheat, maize/corn, barley, oats, rye, rice, and the like, and peanuts.

Toxin—this term shall mean any of a variety of toxins that can be treated using ozone according to embodiments of the present invention.

Odor—this term shall mean any of a variety of odors or smells that can be treated using ozone according to embodiments of the present invention.

Storage container—this term shall mean any of a variety of containers for containing or storing large quantities of grain for short or long duration and the like. Examples of storage containers include silos, bins, bins for grain drying such as corn drying bins, hopper bottom bins, and the like. Such storage containers are often round and have typical diameters ranging from approximately fifteen feet to approximately one hundred twenty feet.

According to embodiments of the invention, a method for treatment of grain for toxins and/or odors includes placing an initial quantity of grain in a storage container having a grain storage space and an aeration floor that allows air to flow through the aeration floor into the grain storage space. Ozone mixed in air is supplied to the grain through the aeration floor under positive pressure, whereby ozone is forced through the aeration floor into a lower portion of the grain storage space. After an initial treatment time, the initial treatment time allowing for the ozone to reduce toxins and/or odors in a lowermost portion of the initial quantity of grain an effective or desired amount, a lowermost portion of the grain in the grain storage space is removed, and new grain is added on top of an uppermost portion of the grain in the grain storage space, all while continuing to supply ozone with air through the aeration floor under positive pressure.

The grain may be removed from the lowermost portion in an amount approximately equal to an amount of new grain added on top of the uppermost portion. In fact, the grain may be substantially continuously removed from the lowermost portion while substantially continuously adding new grain to the storage space. The rates of adding and removing grain may be selected so as to ensure that all grain removed from the lowermost portion has been exposed to ozone for a treatment time sufficient to reduce toxins and/or odors the effective or desired amount. Thus, the rate of adding and removing grain may be slowed for grain having higher concentrations of toxins/odors and quickened for grain having lower concentrations of toxins/odors.

To reduce environmental concerns with the use of ozone, the amount of grain in the storage container may be maintained at sufficient levels such that the ozone forced into the grain storage space does not penetrate all the way through the grain to the top, and therefore does not escape or need to be recaptured. Instead, the ozone reacts with the grain, toxins, odor-causing molecules, etc. and is essentially used up as it passes upward through the grain.

In some embodiments, the storage container is one of a plurality of storage containers, each storage container having a grain storage space and an aeration floor. A density separator or other mechanism may be used to separate incoming grain into a plurality of grain streams of different densities and/or toxin levels. The grain from different grain streams may be provided to different storage containers where it is treated by ozone mixed with air forced through the aeration floor. Treatment times for each of the storage containers may be made different using one or more of several techniques. In a first technique, grain is removed and/or added to different storage containers at different rates, thereby effectively changing the duration of treatment for grain in each storage container. In a second technique, different concentrations of ozone are supplied to different storage containers.

In a third technique, a lowermost portion of the grain in a first storage container is removed from the first storage container and added on top of an uppermost portion of the grain in a second storage container and a lowermost portion of the grain in the second storage container is removed from the second storage container. In this daisy-chain method, which can be repeated across two, three, or more storage containers, the grain is treated in each storage container, thus effectively lengthening the treatment time for grain so treated.

In some instances, the grain removed from the first storage container is mixed with new incoming grain before or while being added to the second storage container. This allows the same storage containers to simultaneously be used to treat grain from different grain streams (having different initial amounts of toxins/odors) by having initially-lower-toxin/odor-level grain pass through a storage container with initially-higher-toxin/odor-level grain after the initially-higher-toxin/odor-level grain has already received one or more treatment passes through a storage container. Additionally in some embodiments, grain treated in different storage containers and/or for different lengths of time is remixed after treatment is complete.

In some multi-storage-container embodiments, a lowermost portion of the grain is removed from the bottom of each of the storage containers and new grain is added to the top of in a continuous process while continuing to supply air containing ozone through the aeration floors.

Some embodiments of the invention provide a system and method for treatment of grain for toxins/odors in a continuous first-in-first out process by periodically to continuously removing a first quantity of grain from the bottom of a storage container having a grain storage space and an aeration floor that allows air to flow through the aeration floor into the grain storage space, by supplying air containing ozone through the aeration floor under positive pressure, whereby ozone is forced through the aeration floor into a lower portion of the grain storage space, the ozone reducing toxins and/or odor in a lower portion of the grain an effective amount, and by periodically to continuously adding a second quantity of grain on top of an upper portion of grain in the grain storage space, whereby the grain storage space remains sufficiently filled that the ozone supplied through the aeration floor with air is unable to percolate and escape through the top of the grain stored in the storage space. In other words, the ozone is used up before passing all the way through the grain. In at least some instances, the periodic removal and addition of grain occur in a substantially-continuous fashion.

In some embodiments, the grain is removed using a process or mechanism that ensures removal of grain substantially evenly from all portions of the bottom of the storage container. The grain is added to the storage container such that it is substantially evenly dispersed to all portions of the top of the storage container. In this fashion, the grain passes through the storage container in a first-in-first-out manner.

Some embodiments of the invention provide a system and method for treatment of grain for toxins in one of a continuous first-in-first out process and a batch process using a system comprising a plurality of storage containers, each storage container having a grain storage space and an aeration floor that allows air to flow through the aeration floor into the grain storage space. Incoming grain is separated according to the presence of different amounts of toxins and/or odors to be treated. This may be done using a density separator or using any other method known in the art. The grain may be separated into batches or streams of grain. The separated grain is passed to different storage containers, where it is treated with ozone for different amounts of time according to the toxin and/or odor levels present.

In such embodiments, treating the grain involves periodically to continuously adding grain from a selected grain source to a storage container assigned to the selected grain source. Ozone is supplied with air through the aeration floor of the assigned storage container under positive pressure, whereby ozone is forced through the aeration floor into a lower portion of the grain storage space, the ozone reducing toxins/odors in a lower portion of the grain an effective amount. A quantity of the grain is periodically to continuously removed as treated grain from the bottom of the assigned storage container.

The grains having different levels or amounts of toxins/odors may be treated with ozone for different amounts of time or using different concentrations of ozone in the air. Where different amounts of time of treatment are used, the different amounts of time of treatment are provided using at least one several techniques, including 1) removing grain from the bottom of each of the assigned storage containers at different rates; and 2) cycling grain having higher initial toxin/odor amounts through more than one storage container in daisy-chain fashion. In the daisy-chain treatment mechanism, the grain having higher initial amounts of toxins/odor are exposed to repeated treatments of ozone in the different storage containers.

Figure 1:
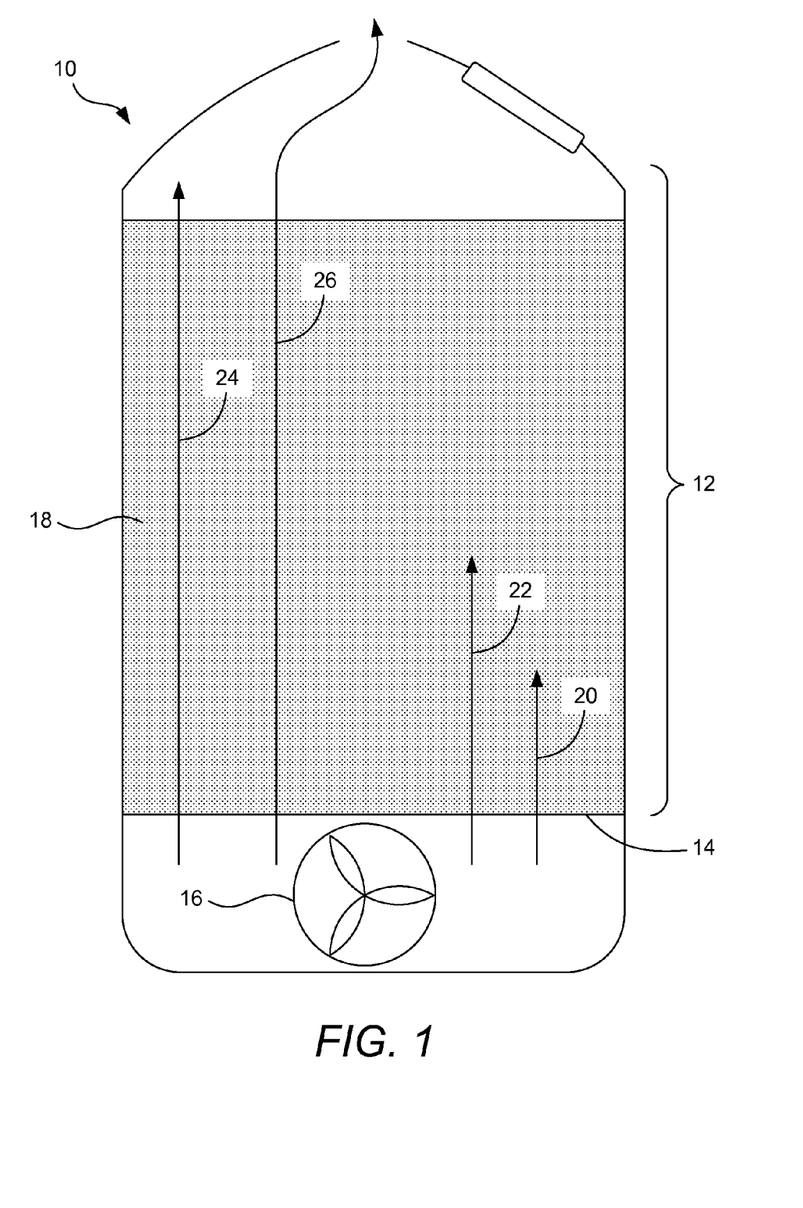
FIG. 1 shows an illustration of an exemplary storage container for use with embodiments of the present invention.

FIG. 1 shows a storage container 10 of a type that may be used with embodiments of the present invention. The elements of the storage container 10 (or other elements) are not necessarily shown to scale in FIG. 1 or in subsequent Figures, instead being illustrated in a manner so as to enhance clarity of the Figures and the accompanying description. The storage container 10 includes a grain storage space 12 for storing grain. The storage container 10 also includes a aeration floor 14. The aeration floor 14 allows air or other gases to pass through the aeration floor 14 into the grain storage space 12 under positive pressure. The positive pressure may be delivered by a fan 16 or any other device known in the art.

In embodiments of the invention, gaseous ozone mixed with air is supplied to the grain storage space 12 through the aeration floor 14 from one or more ozone generators (not shown). The ozone may be delivered in various concentrations and quantities, and it will be understood from this description and from practice of the invention that many different quantities and concentrations may be used to effectively treat grain in the storage space 12 with the ozone. Although specific concentrations and quantities of ozone may be discussed herein, it is deemed a matter of simple testing to determine what quantities and concentrations, along with associated times of treatment are effective in treating different grains for different kinds of toxins and/or odor, and it is therefore impossible to list herein all possible effective concentrations and quantities of ozone that may be used with embodiments of the invention for at least this reason. Additionally, it is further impossible to list all the possible concentrations and quantities of ozone and/or all times of treatment, as the definition of effective treatment varies from situation to situation.

For example, in one situation, a particular sample of grain may be determined to have a certain concentration "A" of a particular toxin/odor, and it may be determined that after treatment, the concentration of toxin/odor should be reduced to level "B." In another situation, however, the initial concentration may be of level "C" (either higher or lower than levels "A" and/or "B") and that the needed final concentration is of level "D" (that may also be either higher or lower than levels "A" and/or "B"). As may be appreciated, these various situations may be advantageously obtained with different amounts or concentrations of ozone for different treatment times, but all such treatment times and ozone concentrations/amounts are embraced by embodiments of the invention, whether or not specifically listed herein. Nevertheless, and by way of example only, embodiments of the invention have been effectively utilized with ozone concentrations in the range of approximately 200-800 parts per million (ppm) for treatment times of roughly two hours to eight hours. In some instances, lower concentrations and/or lower treatment times than 200 ppm and two hours and/or higher concentrations and/or treatment times than 800 ppm and eight hours may be used. For example, in instances where ozone delivery and air flow is less than uniform or is less than completely delivered to all areas of the grain, it may be desirable to increase ozone concentrations and/or treatment times to ensure all grain is treated. Thus the specific example discussed above is given by way of example only, and is not considered to be limiting.

FIG. 1 illustrates one difficulty of delivering ozone through the aeration floor 14 into the grain storage area 12 that is addressed by embodiments of the invention. Assuming the grain storage area 12 has a quantity of grain 18 in it, the ozone forced into the grain storage area 12 under positive pressure will interact with the grain and any toxins/odors therein, and will additionally decompose naturally. Any ozone that remains after such interactions are complete should normally be captured so as not to be a hazard to people, animals, or the like outside the storage container 10. For example, the Occupational Safety and Health Administration (OSHA) imposes limitations and requirements (e.g. permissible exposure limits) regarding the levels of ozone that may be present in a given workplace.

Thus, FIG. 1 illustrates the difficulty of supplying ozone to a storage container 10 full of grain 18. If the ozone is supplied in too low a concentration at too low a pressure, the ozone will effectively travel upward through the grain 18 as illustrated by arrow 20. Because the ozone decomposes and/or interacts with the grain 18 in the lower portion of the storage container 10, only the lower portion of the grain 18 is effectively exposed to the ozone and treated. Similarly, even if the pressure and/or concentration is increased (as illustrated by arrow 22), some of the grain remains untreated. Thus, to treat grain statically stored in the storage container 10, ozone must be supplied under sufficient concentration and/or pressure to pass upward through the entire volume of grain, as illustrated by arrow 24. The problem with such treatment is that ozone will then necessarily escape from an upper surface of the grain, and out of the storage container 10, as illustrated by arrow 26. To prevent ozone escape, the ozone must then be recaptured and destroyed or recycled. Dealing with escaping ozone greatly increases the complexity and cost of using ozone to treat grain.

Figure 2:
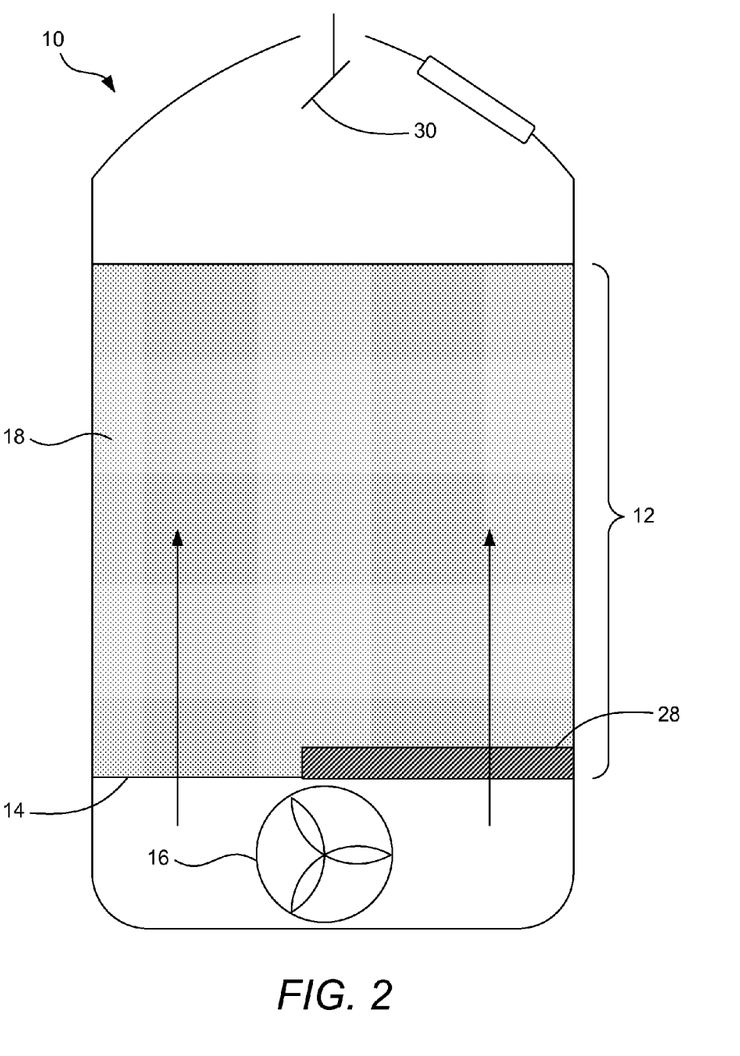
FIG. 2 shows an illustration of an exemplary storage container with features aiding in use with embodiments of the present invention.

Embodiments of the invention obviate the need to deal with escaping ozone by limiting the area of treatment of grain within the storage container 10 to the lower regions of the grain 18, as illustrated in FIG. 2. When ozone is supplied in such a way that it does not pass entirely through the grain 18 and escape from an upper surface of the grain 18, the ozone remains trapped in the storage container 10 by the grain 18 and its interaction with the grain 18 and any toxins and/or odors therein. Thus, it is not necessary to recapture, destroy, and/or recycle ozone when embodiments of the invention are used. Instead, to ensure treatment of all the grain, embodiments of the invention rely on methods that supply the grain 18 to the storage container 10 using first-in-first-out (FIFO) methods.

FIG. 2 illustrates how the storage container 10 is configured to provide FIFO passage of grain through the storage container 10. In the storage container 10 illustrated in FIG. 2, a mechanism 28 for removing a lowermost portion of the grain 18 in the grain storage area 12 is provided. The mechanism 28 for removing a lowermost portion of the grain 18 is one of any of a variety of such systems or mechanisms currently known in the art or later invented, such as a variety of grain or silo reclaimers, such as a sweep auger, a tapered sweep auger, a bin sweep, a ring drive reclaimer, a center drive reclaimer, a conical hopper reclaimer, and the like. In some embodiments, the storage container 10 is shaped so as to encourage FIFO passage of the grain through the storage container 10 without using a mechanical device. In such embodiments, the mechanism 28 may be the geometric configuration of the storage container 10 itself.

The storage container 10 also includes a grain spreader 30, which is any type of spreader now known or later invented for evenly spreading grain in the storage container 10, such as a motorized bin level, a gravity flow spreader, cone spreaders, and the like. The grain spreader 30 adds new grain on top of an uppermost portion of the grain 18 in the grain storage space 12 evenly. As grain is essentially evenly removed from the bottom of the grain storage space 12 by the mechanism 28 and is essentially evenly added to the top of the grain 18 in the grain storage space 12 by the grain spreader 30, grain is able to pass through the storage container 10 in a FIFO manner. This allows all the grain 18 to be treated even though only a lowermost portion of the grain is exposed to ozone at any one time.

If the grain is removed (from the bottom) at substantially or approximately the same rate at which it is added (to the top), the grain level in the storage container 10 remains essentially constant and/or fluctuates only slightly. Even if there are larger-scale variations over time, grain can be added more quickly at times where the grain level has decreased or more slowly at times where the grain level has increased. In at least some embodiments, the grain is removed and added in batches, such as removing a certain quantity of treated grain from the bottom of the grain storage space 12 and adding a certain quantity of grain to be treated to the top of the grain storage space 12. In other embodiments, grain is substantially continuously removed and added. In ways such as this, grain can be treated in a substantially-continuous process using a single storage container 10.

The rate of adding and removing grain may be selected so as to ensure that all grain removed from the lowermost portion of the grain storage space 12 has been exposed to a sufficient quantity/concentration of ozone for a treatment time sufficient to reduce any toxins present in the grain by a desired or effective amount. Thus, the rate of adding and removing grain can be slowed for grain having higher concentrations of one or more toxins/odors (i.e. grain requiring greater levels of treatment) and quickened for grain having lower concentrations of one or more toxins/odors (i.e. grain requiring lesser levels of treatment).

Figure 3:
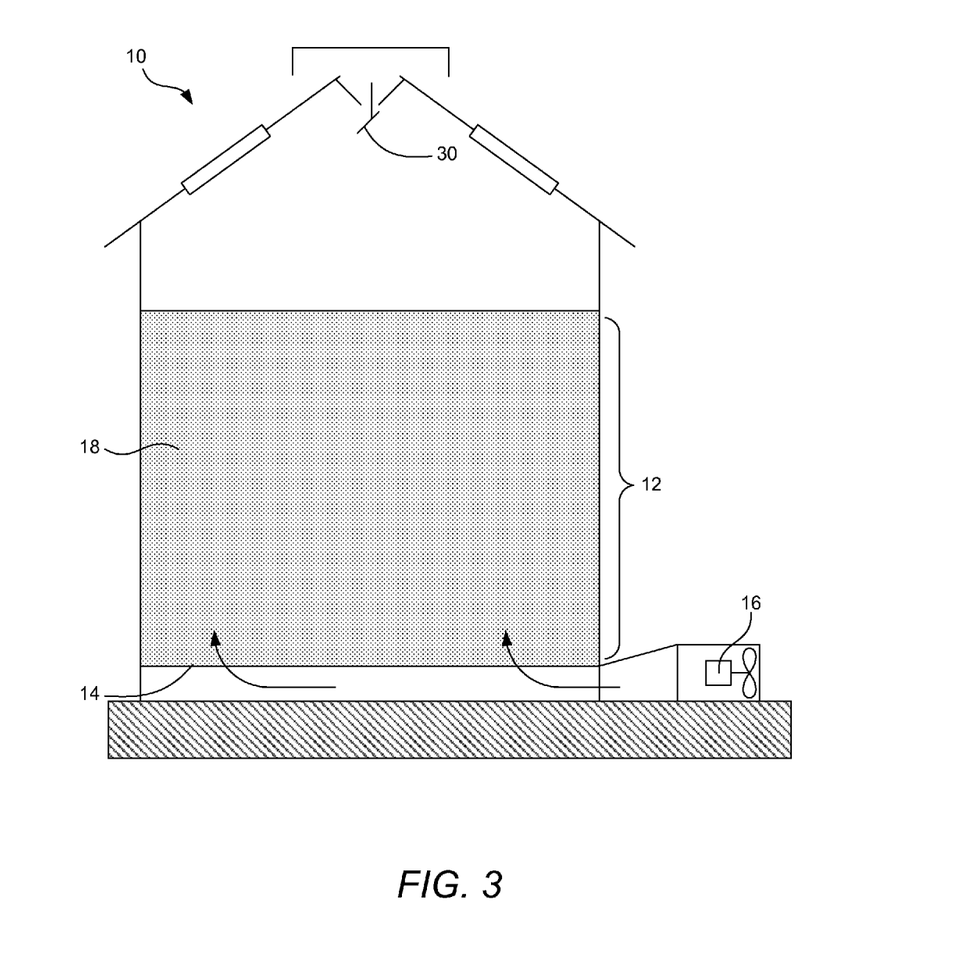
FIG. 3 shows a an alternative depiction of a storage container for use with embodiments of the present invention.

Thus, embodiments of the invention embrace the treatment of grain in any of a variety of storage containers 10 (such as silos, corn drying bins and the like) where only a single storage container 10 is used in the process. For example, FIG. 3 shows a depiction of an exemplary single corn drying bin as a storage container 10 for use with embodiments of the invention.

Figure 4:
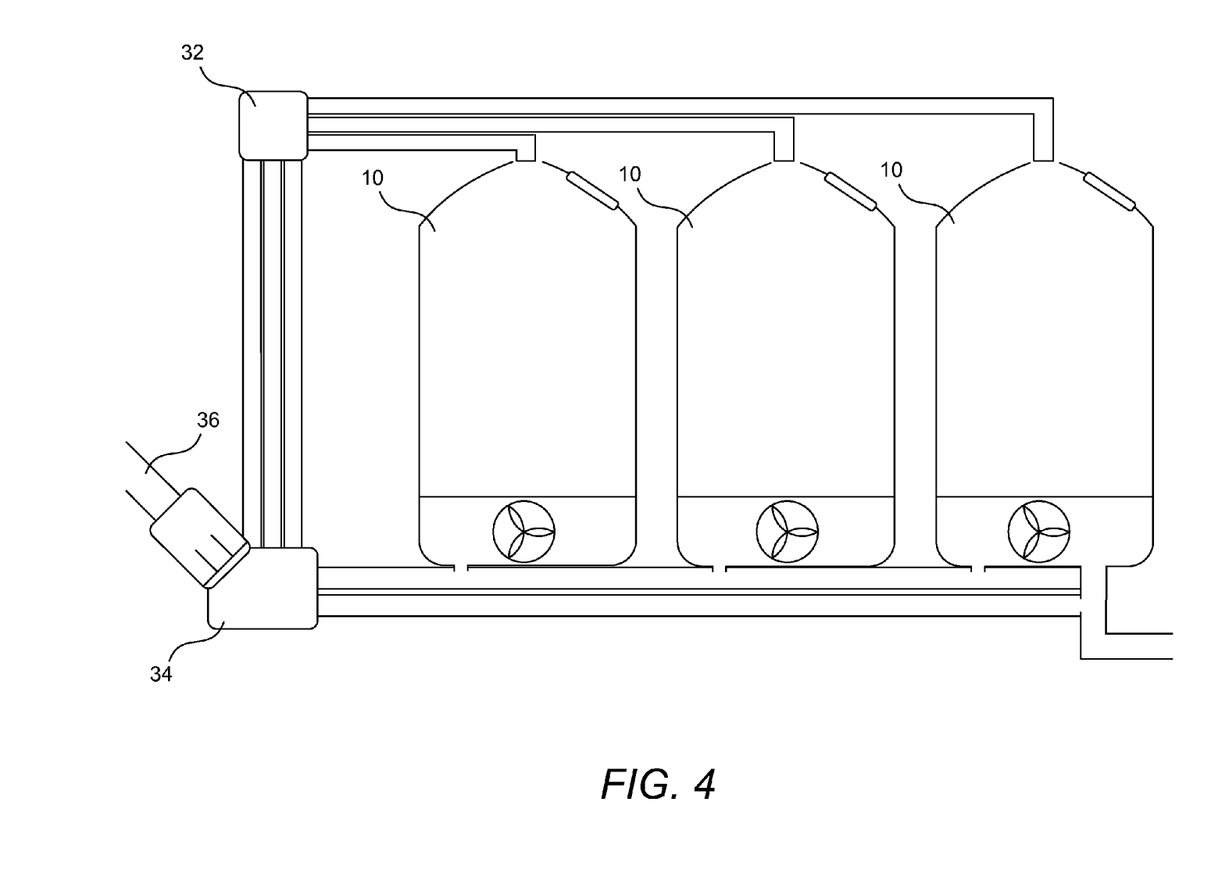
FIG. 4 illustrates a system of storage containers in an embodiment of the present invention.

As illustrated in FIGS. 4-10, embodiments of the invention embrace the use of systems incorporating more than one storage container 10 in the treatment of grain using ozone. In these Figures, three storage containers 10 are shown, but it should be understood that two, four, or more storage containers 10 may be used in embodiments where more than one storage container 10 is used. FIG. 4 illustrates several of the features of some such embodiments. In FIGS. 4-10, the mechanism 28 for removing a lowermost portion of the grain and the grain spreader 30 are not specifically illustrated for simplicity and clarity of illustration, but it should be understood that such features are or may be incorporated into each storage bin 10 where appropriate.

In the embodiment of FIG. 4, three storage containers 10 are connected to a grain distribution system 32 that conveys grain to and from the storage containers 10. The grain distribution system 32 includes any of a wide variety of systems for the transport of grain that are known in the art, including one or more conveyor systems, auger systems, pipes, and the like, including networks of the same. The grain distribution system 32 is configured to permit the conveying of grain that is to be treated and/or that has been treated from one location, such as a particular storage container 10, to another. Included in the system illustrated in FIG. 4 is a grain separator 34. The grain separator 34 allows grain coming into the system, such as from a grain source 36 (which may be a part of the grain distribution system 32) to be separated according to the levels of toxins/odors contained in the incoming grain.

For example, in at least some instances, grain having higher levels of toxins has been found to be less dense (e.g. lighter, or having a lower specific gravity) than grain having lesser levels of toxins. This grain can thus be separated using a density separator as the grain separator 34. It can be advantageous to treat grain having different toxin levels differently. Take, for example, a sample of grain having an overall toxin level of approximately ten parts per million (ppm). In this example, it may be desired to reduce the toxin level to an amount less than two ppm. Of the grain in the grain sample, approximately 80% of the grain might have a toxin level of approximately one ppm, while 20% of the grain might have a much higher toxin level of forty ppm or more. These varying toxin levels reflect the varying growing conditions encountered during growth, harvesting, and storage of the grain. Rather than treat all the grain using ozone at identical amounts and times, embodiments of the invention embrace separation of the grain according to toxin levels and treating of the grain according to the separated toxin levels.

In the example recited above, the grain might be separated (such as by density) into two batches or streams of grain, where the first batch or stream has an average toxin level of approximately one ppm, and the other batch or stream has an average toxin level of approximately forty ppm. In this example, the first batch or stream of grain has a toxin level lower than the desired final toxin level, so this batch or stream of grain might receive only a minimal treatment with ozone or no treatment at all. In contrast, the second batch or stream might receive a significant ozone treatment, in a fashion similar to that described above.

After a desired treatment time, the toxin levels of the second batch or stream might be reduced to levels below the desired maximum level of two ppm, after which the grain could be used as desired, whether remixed with the first batch or stream of grain or not. As another example, however, the toxin levels of the second batch or stream may only have been reduced to an amount still higher than the desired maximum level, say six to eight ppm. In at least some embodiments, such treatment may be sufficient, as the grain from the two batches or streams may be remixed into a single batch or stream, where the average total toxin level is less than the desired maximum level. In this case, the final overall toxin level of the remixed grain might be between one and two ppm, below the cutoff level of two ppm for the desired use. Further reductions in toxin levels may be obtained by further or increased ozone treatment of one or both batches or streams of grain of the example.

As may be appreciated by reference to the system illustrated in FIG. 4, when the system includes three storage containers 10, it may be configured to treat three streams or batches of grain differently, in a manner similar to that discussed in the example immediately above. Grain comes into the system from the grain source 36, is separated into the grain streams having different toxin levels by the grain separator 34, and is distributed to the various storage bins 10 by the grain distribution system 32. Of course, it will be appreciated that the separation of the grain into different streams or batches (using the grain separator 34) may occur temporally or spatially distant from the storage containers 10 and the ozone treatment therein.

To effect the different treatment of the various streams of grain, the grain in each storage container 10 may be treated differently, to expose the grain having higher toxin levels to more ozone than the grain having lower toxin levels is exposed to. One way to vary the exposure is to vary the concentration of ozone supplied to each storage container 10. Another way is to vary the air flow (and associated ozone flow) into each storage container 10, as long as any excess ozone is safely recaptured or the ozone flow is controlled so as not to be allowed to pass through an upper surface of the grain in the storage container 10. Still another way is to vary the speed with which grain passes through each storage container 10 (e.g. varying the speed of the mechanism 28): if grain passes more slowly through its storage container 10, it will be exposed to more ozone than grain that passes more quickly through its storage container 10 (assuming equal ozone concentration levels and air flows). An additional way to vary the exposure of the grain to ozone is to cause the grain having higher toxin levels to pass through more than one storage container 10, thereby receiving more than one period of ozone treatment (one per container). It will be appreciated that any or all of these or other methods for varying the exposure of the grain to ozone may be combined as advantageous and desired. Several of these methods will be discussed in more detail below.

Figure 5:
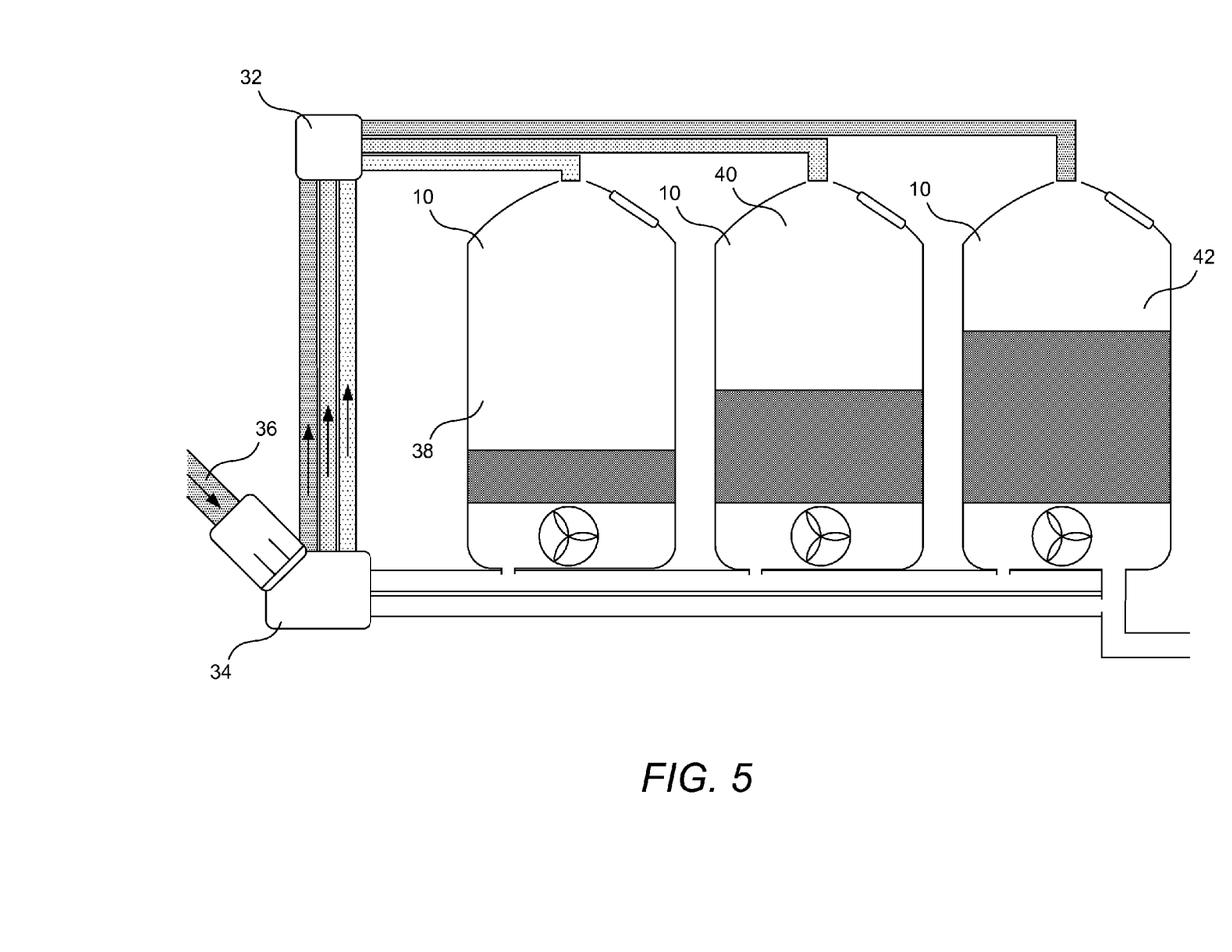
FIGS. 5-10 illustrate methods utilizing the system of FIG. 4 in accordance with embodiments of the invention.

In any method where the grain in each storage container 10 is treated with different amounts of ozone, the different storage containers 10 may be viewed according to their respective treatment cycles, such as a heavy treatment container 38, a medium treatment container 40, and a light treatment container 42, as illustrated in FIG. 5. FIGS. 5 through 8 show stages in a multi-storage container batch treatment of grain for toxins. In this treatment paradigm, grain is processed in batches using the heavy treatment container 38, the medium treatment container 40, and the light treatment container 42. In this process, grain that is to be more heavily treated is flipped from storage container 10 to storage container 10, thereby receiving additional ozone treatments.

The process begins as illustrated in FIG. 5, when grain is received by the grain separator 34 from the grain source 36. The grain separator 34 separates the grain into several streams and distributed to the storage containers 10 through the grain distribution system 32 as shown by the arrows of flow. Grain requiring higher treatment levels (heavier treatment) is sent to the heavy treatment container 38, grain requiring medium treatment levels is sent to the medium treatment container 40, and grain requiring lesser treatment levels is sent to the light treatment container 42. In each of the containers, ozone is delivered to the grain through the aeration floors 14, as driven by the fans 16. It will be understood that the concentration of ozone and/or air flow in each storage container 10

Figure 6:
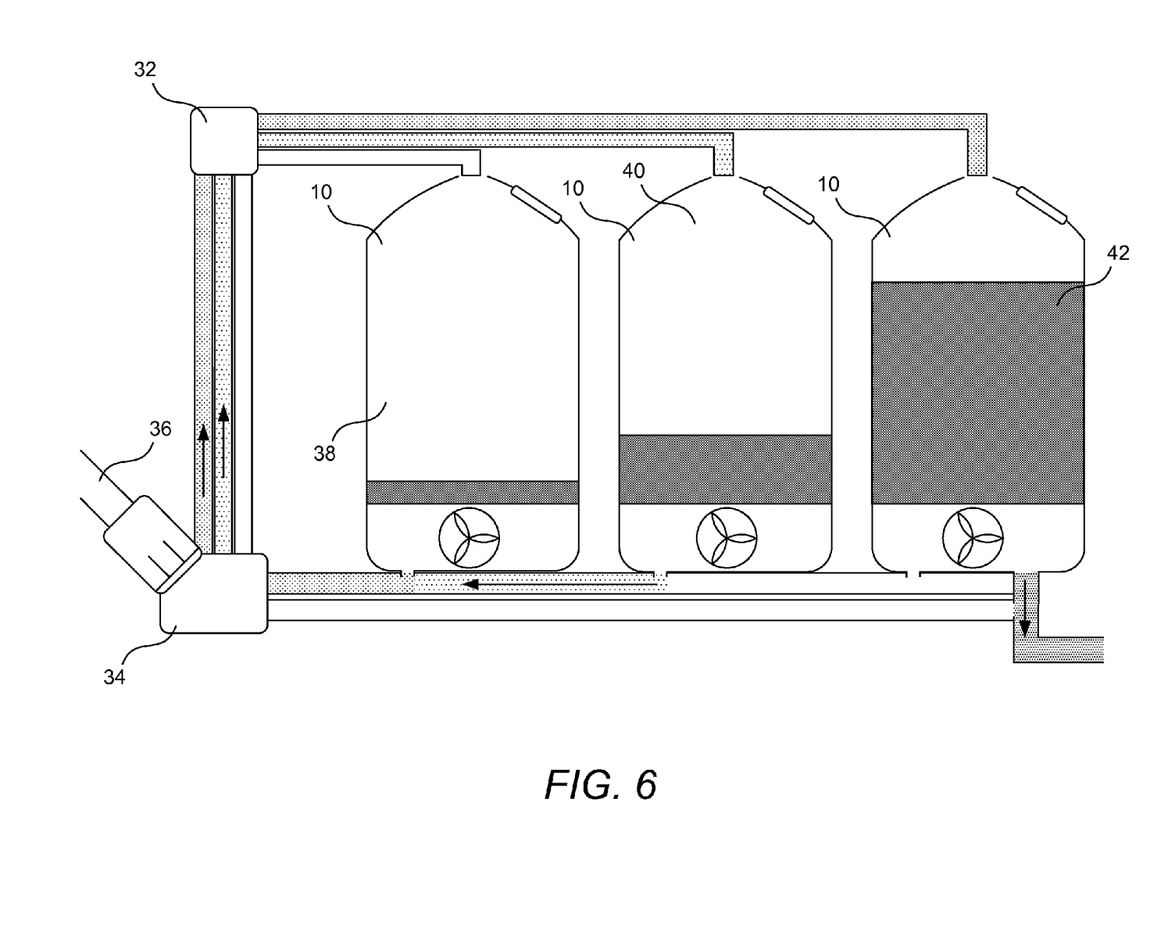

Further stages of the batch process are illustrated with reference to FIG. 6. In this Figure, it can be seen that fully-treated grain is removed from a lower portion of the light treatment container 42 and is thus removed from the system. Meanwhile, grain is also removed from the lowermost portions of the medium treatment container 40 and the heavy treatment container 38, and reenters the grain distribution system 32. This grain is not fully treated, and it is returned to another of the storage containers 10. The grain from each of the heavy treatment container 38 and the medium treatment container 40 may be kept separate from each other for continued treatment, if necessary, or it may be remixed. If the grain is remixed, it may be re-separated by the grain separator 34, if practical and necessary.

The partially-treated grain is then delivered to another storage container 10. In the example illustrated in FIG. 6, the grain removed from the bottom of the heavy treatment container 38 is added to the top of the grain in the medium treatment container 40, while the grain removed from the bottom of the medium treatment container 40 is added to the top of the grain in the light treatment container 42. In this way, the grain originally routed to the medium treatment container 40 is passed to the light treatment container 42 for a second ozone treatment, while the grain originally routed to the heavy treatment container 38 is passed to the medium treatment container 42 for a second ozone treatment. As discussed above, the concentrations of ozone and/or air flow rates in each storage container 10 may be varied and different.

Figure 7:
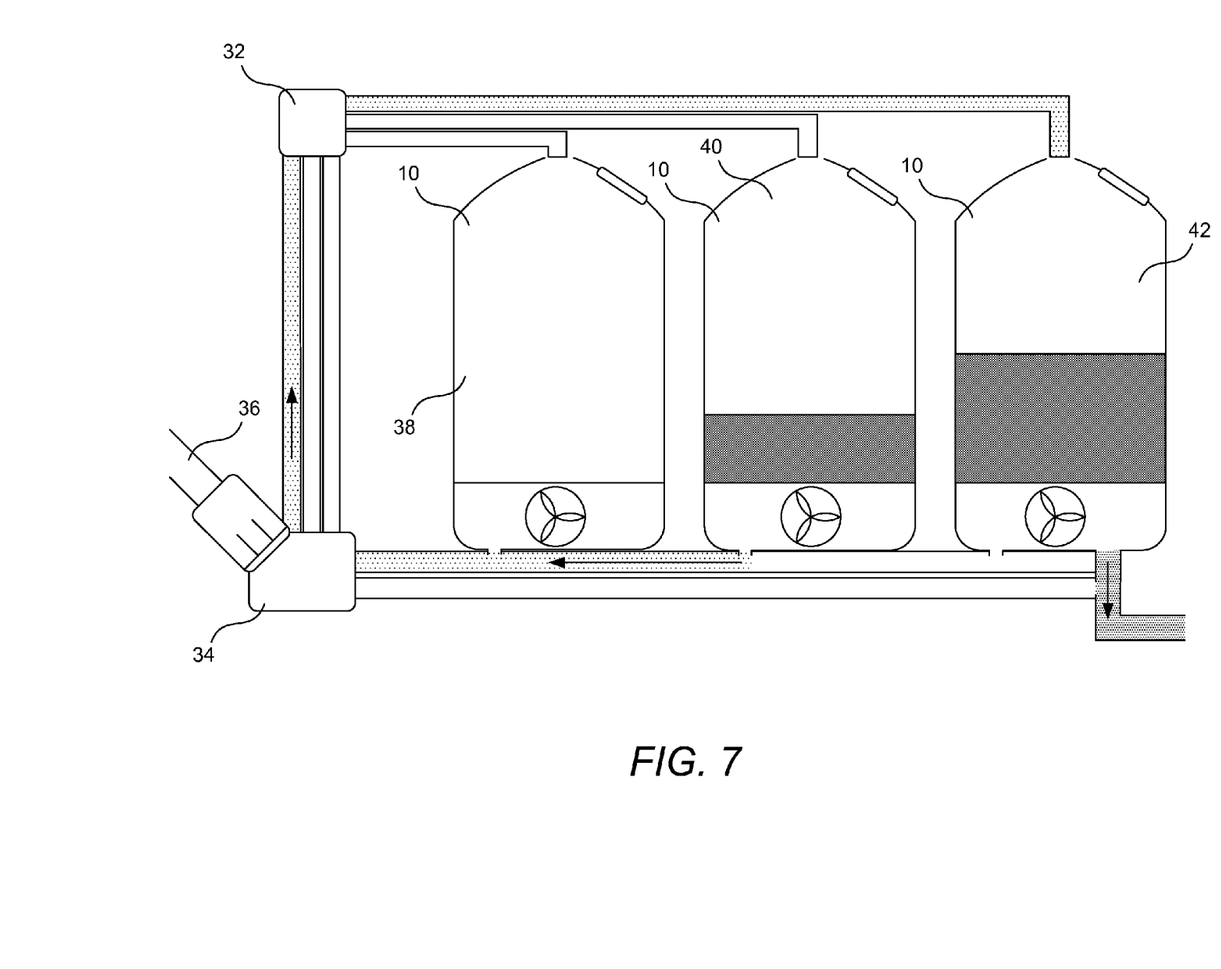
Figure 8:
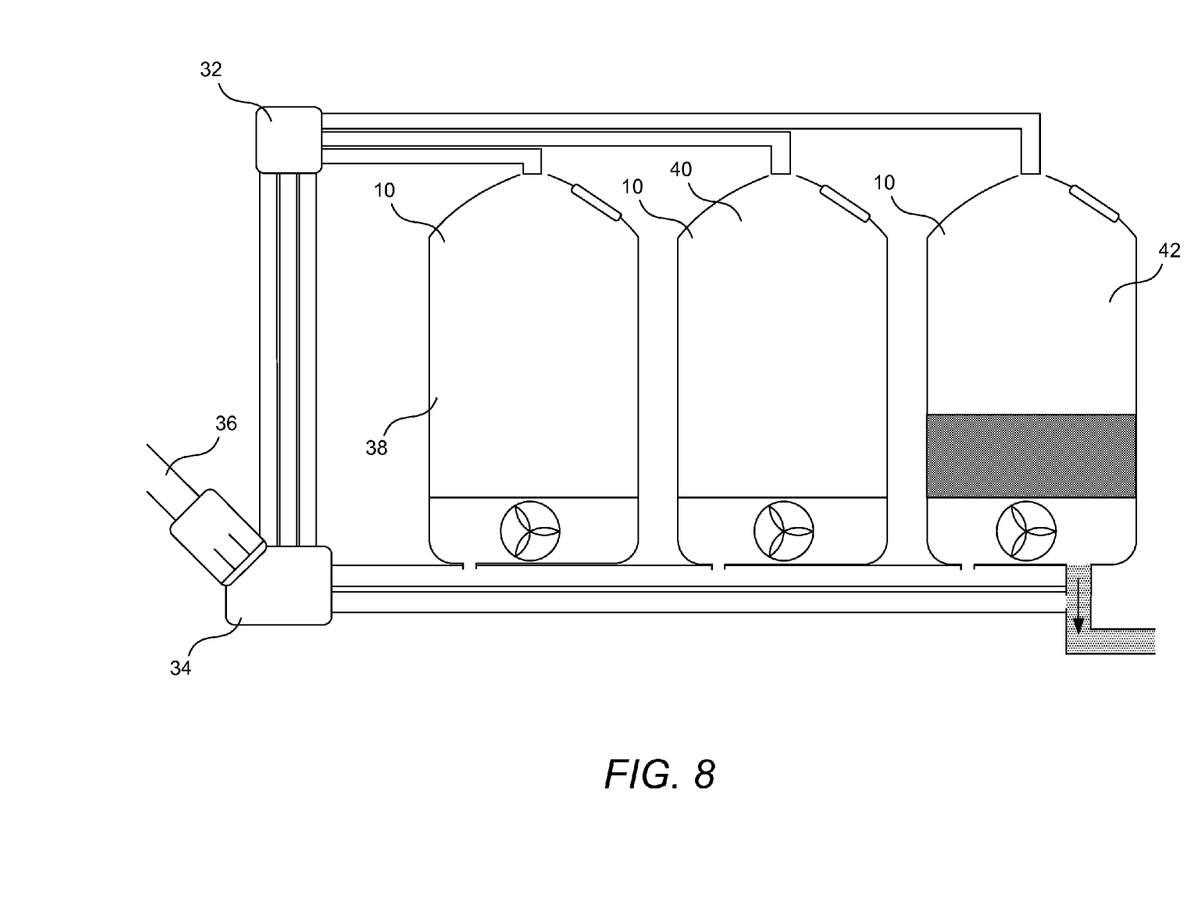

FIG. 7 illustrates still further stages of the batch grain treatment process. In this Figure, it can be seen that the heavy treatment container 38 has been completely emptied. Ozone is therefore no longer delivered to the heavy treatment container 38. Fully-treated grain (which may include grain that was only treated once, in the light treatment container 42, along with grain that was treated twice, once in the medium treatment container 40 and once in the light treatment container 42) continues to be removed from the bottom of the light treatment container 42. Twice-treated grain (grain that was originally supplied to the heavy treatment container 38 and was flipped into the medium treatment container 40) is also removed from the bottom of the medium treatment container, and is returned to the grain distribution system 32. The grain distribution system 32 passes the twice-treated grain to the top of the grain in the light treatment bin 42, where the grain receives an additional treatment with ozone, before being removed from the bottom of the light treatment bin 42 as illustrated in FIG. 8.

In the batch treatment process illustrated in FIGS. 5-8, fully-treated grain may be essentially continuously removed from the bottom of the light treatment container 42 once the treatment of the initial grain in the light treatment container 42 is complete. During the initial stages of the process, the fully-treated grain is entirely grain that has only received one treatment, in the light treatment container 42. As the process proceeds, the fully-treated grain that is later removed transitions to grain that was treated twice: once in the medium treatment container 40 and once in the light treatment container 42. Then, as the batch process nears completion, the fully-treated grain that is removed last transitions to grain that was treated three times, once in each of the treatment containers 38, 40, and 42. As discussed above, all treated grain may be remixed after treatment is complete to maximize homogeneity of the treated grain and to avoid isolated portions of grain having significantly higher or lower levels of toxins.

In an alternate process to that shown in FIGS. 5-8, grain is initially supplied to the grain separator 34 from the grain source 36 and is supplied to the heavy treatment container 38, the medium treatment container 40, and the light treatment container 42, as illustrated in FIG. 5. This process may occur in batches, periodically, or essentially continuously. The grain in each of the treatment containers 38, 40, and 42 is treated using at least one of different lengths of time (such as by varying the rate of grain removal from the bottom of each treatment container 38, 40, and 42), different concentrations of ozone (such as heavier concentrations in the heavy treatment container 38 than in the light treatment container 42), and different flow rates of ozone into the treatment containers 38, 40, and 42 (such as heavier ozone flow rates into the heavy treatment container 38). The grain from the bottom of each treatment container 38, 40, and 42 is then removed and is remixed as fully-treated grain, with all grain having undergone only a single, albeit varied, treatment.

Figure 9:
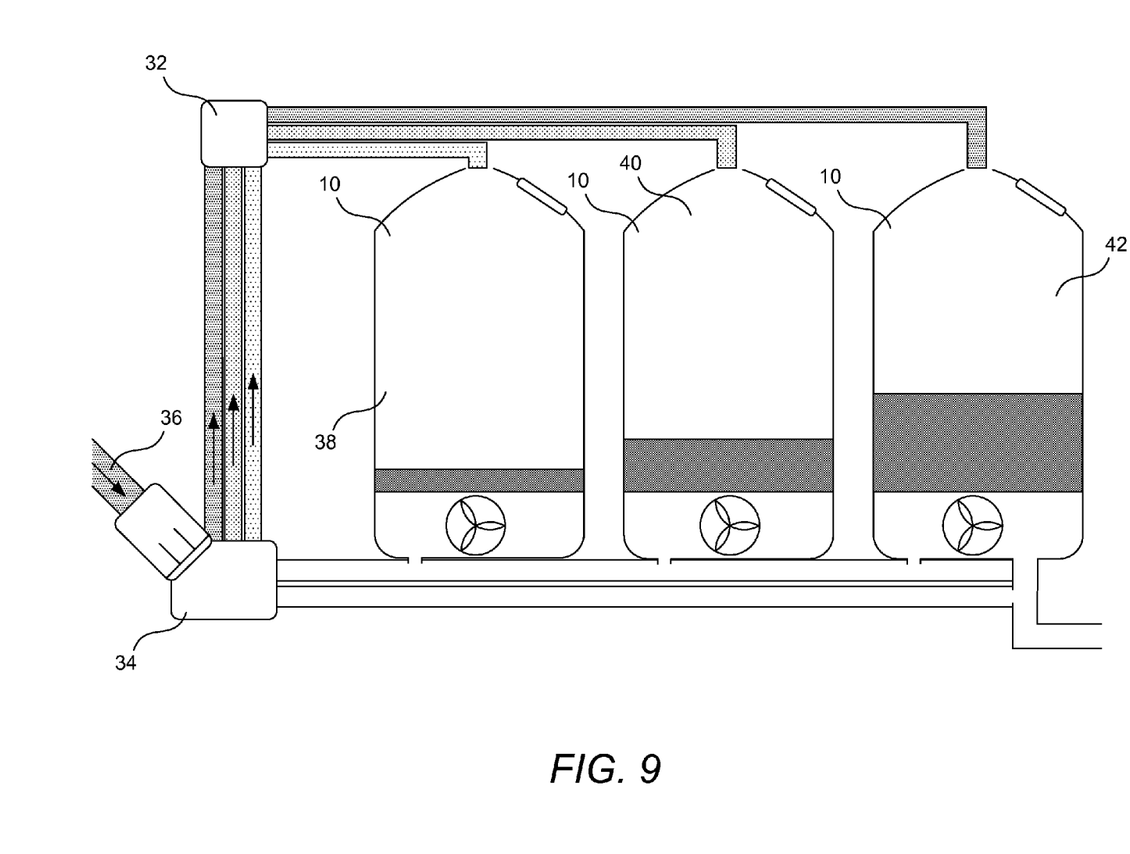
Figure 10:
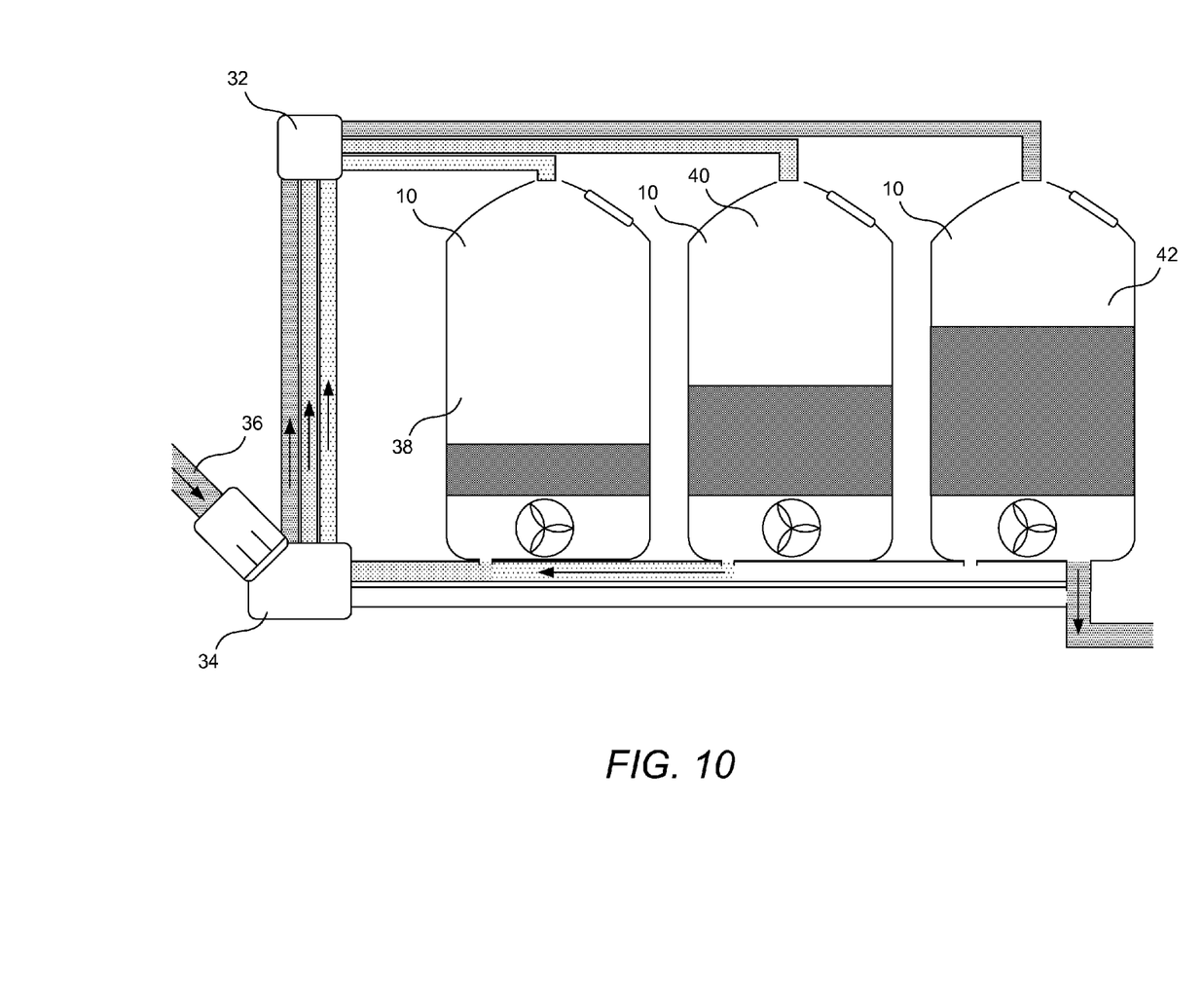

An alternate process, this treatment process being adapted as a continuous process, is illustrated in FIGS. 9 and 10. The treatment process begins as in FIG. 5, with grain being separated into various grain streams by the grain separator 34 as it is received from the grain source 36. The various grain streams are delivered through the grain distribution system 32 to the heavy treatment container 38, the medium treatment container 40, and the light treatment container 42. When sufficient grain is in each treatment container 38, 40, and 42, treatment using ozone begins. After an initial treatment time has passed, the treatment process enters the continuous stage as illustrated in FIG. 10.

In the continuous stage, fully-treated grain is periodically to continuously removed from the bottom of the light treatment container 42, as shown. Meanwhile, partially-treated grain is periodically to continuously removed from the bottom of the medium treatment container 40 and is supplied to the top of the light treatment container 42 by the grain distribution system 32, where it will be treated a second time. Similarly, partially-treated grain is periodically to continuously removed from the bottom of the heavy treatment container 38 and is supplied to the top of the medium treatment container 40 by the grain distribution system 32, where it will be treated a second time. Meanwhile, additional grain is periodically to continuously supplied to the system from the grain source 36 and is directed by the grain separator 34 to the various treatment containers 38, 40, and 42.

Thus, as time passes, new untreated grain for heavy treatment is periodically to continuously being supplied to the heavy treatment container 38. Meanwhile, a mix of untreated grain for medium treatment and partially-treated grain that originally required heavy treatment but has been treated once is periodically to continuously being supplied to the medium treatment container 40. Also meanwhile, a mix of untreated grain for light treatment, partially-treated grain that originally required medium treatment but has been treated once, and partially-treated grain that originally required heavy treatment but has been treated twice is periodically to continuously being supplied to the light treatment container 42. Thus, in the continuous stage, the fully-treated grain that is periodically to continuously removed from the bottom of the light treatment container 42 includes a mixture of grain that has been treated once, twice, or three times, depending on the treatment needs of the grain.

It may be appreciated that one or more of the treatment modalities discussed above provides a process whereby grain streams having higher amounts of toxins/odors are cycled through more than one storage container 10 in daisy-chain fashion, whereby the grain from grain streams having higher concentrations of toxins/odors are exposed to repeated treatments of ozone in the different storage containers 10. As discussed, several of the treatment modalities discussed above may occur using periodic grain additions and removals, and may further occur in continuous or substantially-continuous fashion. It has been found that systems and methods in accordance with the embodiments discussed in detail above are capable of treating large amounts of grain, such as fifty to eighty thousand bushels a day.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for continuous treatment of grain for toxins, comprising:
    separating grain into a plurality of grain streams with a density separator, thus producing more dense grain having lower levels of toxins and less dense grain having higher levels of toxins;
    placing an initial quantity of the less dense grain in a storage container having a grain storage space and an aeration floor that allows air to flow through the aeration floor into the grain storage space;
    wherein the storage container is one of a plurality of storage containers, each storage container having the grain storage space and the aeration floor that allows the air to flow through the aeration floor into the grain storage space;
    supplying ozone through the aeration floor under positive pressure to the less dense grain at a concentration of 200-800 ppm, whereby the ozone is forced through the aeration floor into a lower portion of the grain storage space;
    waiting for an initial treatment time allowing for the ozone to reduce toxins in a lower treated portion of the initial quantity of the less dense grain;
    performing the following while continuing to supply ozone through the aeration floor under positive pressure:
    removing the lower treated portion of the less dense grain in the grain storage space; and
    adding new grain on top of the less dense grain in the grain storage space.

2. A method as recited in claim 1, wherein grain is removed from the lower treated portion in an amount approximately equal to an amount of new grain added on top of the grain in the grain storage space.

3. A method as recited in claim 1, wherein a rate of adding and removing grain is selected so as to ensure that all grain removed from the lower treated portion has been exposed to ozone for a treatment time sufficient to reduce toxins the effective amount.

4. A method as recited in claim 3, wherein the rate of adding and removing grain is slowed for grain having higher concentrations of toxins and quickened for grain having lower concentrations of toxins.

5. A method as recited in claim 1, wherein treatment times for each of the storage containers are different.

6. A method as recited in claim 1, wherein a lower treated portion of the grain in a first storage container is removed from the first storage container and added on top of the grain in a second storage container and a lower treated portion of the grain in the second storage container is removed from the second storage container.

7. A method as recited in claim 6, wherein the grain removed from the first storage container is mixed with new incoming grain before or while being added to the second storage container.

8. A method as recited in claim 1, further comprising:
    treating the grain of the different grain streams with ozone for different amounts of time;

removing grain from a lower treated portion of each of the storage containers at different rates; and cycling grain from grain streams having higher amounts of toxins through more than one storage container in daisy-chain fashion, whereby the grain from grain streams having higher amounts of toxins are exposed to repeated treatments of ozone in the different storage containers.

9. A method as recited in claim 1, wherein the amount of grain in the storage container is maintained at a level sufficient to react with the ozone being supplied, such that the ozone does not escape or need to be recaptured.

10. A method for treatment of grain for toxins in one of a continuous first-in-first out process and a batch process using a system comprising a plurality of storage containers, each storage container having a grain storage space and an aeration floor that allows air to flow through the aeration floor into the grain storage space, the method comprising:

separating incoming grain into a plurality of grain streams having different amounts of toxins to be treated, thus producing more dense grain having lower levels of toxins and less dense grain having higher level of toxins;

providing grain from the plurality of grain streams to different storage containers;

treating the grain of the plurality of grain streams with ozone for different amounts of time, wherein treating the grain from each grain stream comprises:

periodically to continuously adding grain from a selected grain stream to a storage container assigned to the selected grain stream;

supplying ozone through the aeration floor of the assigned storage container under positive pressure to the grain at a concentration of 200-800 ppm, whereby the ozone is forced through the aeration floor into a lower portion of the grain storage space and does not pass to or through an upper surface of the grain and into a storage space of the storage container, the ozone reducing toxins and/or odor in a lower portion of the grain an effective amount;

periodically to continuously removing a quantity of treated grain from the bottom of the assigned storage container; and mixing the quantity of the treated grain having the toxins reduced with grain having a desired amount of toxins.

11. A method as recited in claim 10, wherein the grain of the various grain streams is treated with ozone using one of: different amounts of time for the grain of each of the various grain streams; and different concentrations of ozone for the grain of each of the various grain streams.

12. A method as recited in claim 11, wherein the grain of the various grain streams is treated with ozone using different amounts of time and wherein treating the grain of the various grain streams with ozone for different amounts of time comprises at least one of: removing grain from the bottom of each of the assigned storage containers at different rates; and cycling grain from grain streams having higher amounts of toxins through more than one storage container in daisy-chain fashion, whereby the grain from grain streams having higher amounts of toxins and/or odor is exposed to repeated treatments of ozone in the different storage containers.

13. A method as recited in claim 11, wherein the grain of the various grain streams is treated with ozone using different ozone concentrations whereby the grain from grain streams having higher amounts of toxins and/or odor is exposed to higher amounts of ozone.

14. A method as recited in claim 10, wherein the grain of the various grain streams is treated with ozone using different flow rates of ozone into each of the different storage containers.

* * * * *